(12) United States Patent
Du

(10) Patent No.: US 10,691,928 B2
(45) Date of Patent: Jun. 23, 2020

(54) METHOD AND APPARATUS FOR FACIAL RECOGNITION

(71) Applicant: Baidu Online Network Technology (Beijing) Co., Ltd., Beijing (CN)

(72) Inventor: Kang Du, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 199 days.

(21) Appl. No.: 16/050,381

(22) Filed: Jul. 31, 2018

(65) Prior Publication Data

US 2019/0087647 A1  Mar. 21, 2019

(30) Foreign Application Priority Data

Sep. 21, 2017  (CN) .......................... 2017 1 0858135

(51) Int. Cl.
*G06K 9/00* (2006.01)
*G06N 3/08* (2006.01)
*G06K 9/66* (2006.01)

(52) U.S. Cl.
CPC ..... *G06K 9/00288* (2013.01); *G06K 9/00275* (2013.01); *G06K 9/00281* (2013.01); *G06K 9/66* (2013.01); *G06N 3/08* (2013.01)

(58) Field of Classification Search
None
See application file for complete search history.

(56) References Cited

U.S. PATENT DOCUMENTS

| 2016/0148080 | A1* | 5/2016 | Yoo ..................... | G06K 9/4628 |
| | | | | 382/157 |
| 2019/0026538 | A1* | 1/2019 | Wang ................... | G06T 7/20 |
| 2019/0266387 | A1* | 8/2019 | Sun ...................... | G06N 3/04 |
| 2019/0286884 | A1* | 9/2019 | Rhee ..................... | G06K 9/6271 |
| 2019/0332851 | A1* | 10/2019 | Han ....................... | G06K 9/6288 |
| 2019/0370996 | A1* | 12/2019 | Yabuuchi ............. | G06K 9/00281 |

FOREIGN PATENT DOCUMENTS

| CN | 104850825 A | 8/2015 |
| CN | 107045618 A | 8/2017 |

* cited by examiner

*Primary Examiner* — Fayyaz Alam
(74) *Attorney, Agent, or Firm* — Knobbe, Martens, Olson & Bear, LLP

(57) ABSTRACT

Embodiments of the present disclosure disclose a method and apparatus for facial recognition. A specific embodiment of the method includes: acquiring a to-be-recognized image; inputting the to-be-recognized image into a pre-trained first convolutional neural network to obtain complete facial feature information and partial facial feature information, the first convolutional neural network being used to extract a complete facial feature and a partial facial feature; and inputting the complete facial feature information and the partial facial feature information into a pre-trained second convolutional neural network to obtain a facial recognition result, the second convolutional neural network being used to represent a correlation between the facial recognition result, and the complete facial feature information and the partial facial feature information. This embodiment improves the accuracy of the recognition result in a situation where a face is partially covered.

15 Claims, 4 Drawing Sheets

METHOD AND APPARATUS FOR FACIAL RECOGNITION

CROSS-REFERENCE TO RELATED APPLICATIONS

This application claims priority to Chinese Patent Application no. 201710858135.5, filed with the State Intellectual Property Office of the People's Republic of China (SIPO) on Sep. 21, 2017, the content of which is incorporated herein by reference in its entirety.

TECHNICAL FIELD

The present disclosure relates to the field of computer technology, specifically to the field of Internet technology, and more specifically to a method and apparatus for facial recognition.

BACKGROUND

As the Internet technology develops, facial recognition technology has been used in more and more areas. For example, identities may be verified through facial recognition. In general, existing facial recognition methods directly examine an entire facial area in an image. However, in a situation where the face is partially covered (e.g., a situation where sunglasses or a mouth-muffle is worn), only a partial face is displayed in the image. Therefore, the existing methods have an issue of low accuracy of the recognition result in the situation where the face is partially covered.

SUMMARY

An objective of some embodiments of the present disclosure is to provide an improved method and apparatus for facial recognition to solve the technical problem mentioned in a part of the foregoing Background.

In a first aspect, some embodiments of the present disclosure provide a method for facial recognition. The method including: acquiring a to-be-recognized image; inputting the to-be-recognized image into a pre-trained first convolutional neural network to obtain complete facial feature information and partial facial feature information, the first convolutional neural network being used to extract a complete facial feature and a partial facial feature; and inputting the complete facial feature information and the partial facial feature information into a pre-trained second convolutional neural network to obtain a facial recognition result, the second convolutional neural network being used to represent a correlation between the facial recognition result, and the complete facial feature information and the partial facial feature information.

In some embodiments, the complete facial feature information includes a plurality of complete facial feature maps. The plurality of complete facial feature maps include a first complete facial feature map and a plurality of second complete facial feature maps. Each point in the first complete facial feature map represents a confidence level indicating an existence of a complete face in an area in the to-be-recognized image corresponding to the each point. Each point in each of the plurality of second complete facial feature maps represents position information of an area in the to-be-recognized image corresponding to the point in the each of the plurality of second complete facial feature maps.

In some embodiments, the plurality of second complete facial feature maps include four second complete facial feature maps. Points in the four second complete facial feature maps respectively represent a horizontal coordinate of an upper-left vertex, a vertical coordinate of the upper-left vertex, a horizontal coordinate of a lower-right vertex, and a vertical coordinate of the lower-right vertex of a corresponding area in the to-be-recognized image.

In some embodiments, the partial facial feature information includes a plurality of partial facial feature maps. The plurality of partial facial feature maps include at least one first partial facial feature map, and a plurality of second partial facial feature maps corresponding to each of the at least one first partial facial feature map. Each point in the each of the at least one first partial facial feature map represents a confidence level indicating an existence of a partial face in an area in the to-be-recognized image corresponding to the point in the each of the at least one first partial facial feature map. Each point in each of the plurality of second partial facial feature maps represents position information of an area in the to-be-recognized image corresponding to the point in the each of the plurality of second partial facial feature maps.

In some embodiments, the partial face includes at least one of: an eye, a nose, or a mouth.

In some embodiments, the plurality of second partial facial feature maps corresponding to the each of the at least one first partial facial feature map include four second partial facial feature maps. Points in the four second partial facial feature maps respectively represent a horizontal coordinate of an upper-left vertex, a vertical coordinate of the upper-left vertex, a horizontal coordinate of a lower-right vertex of the area, and a vertical coordinate of the lower-right vertex of a corresponding area in the to-be-recognized image.

In some embodiments, the second convolutional neural network is a fully convolutional network. The number of convolutional kernels in the last convolutional layer of the fully convolutional network is five.

In a second aspect, some embodiments of the present disclosure provide an apparatus for facial recognition. The apparatus includes: an acquisition unit, configured to acquire a to-be-recognized image; a first input unit, configured to input the to-be-recognized image into a pre-trained first convolutional neural network to obtain complete facial feature information and partial facial feature information, the first convolutional neural network being used to extract a complete facial feature and a partial facial feature; and a second input unit, configured to input the complete facial feature information and the partial facial feature information into a pre-trained second convolutional neural network to obtain a facial recognition result, the second convolutional neural network being used to represent a correlation between the facial recognition result, and the complete facial feature information and the partial facial feature information.

In some embodiments, the complete facial feature information includes a plurality of complete facial feature maps. The plurality of complete facial feature maps include a first complete facial feature map and a plurality of second complete facial feature maps. Each point in the first complete facial feature map represents a confidence level indicating an existence of a complete face in an area in the to-be-recognized image corresponding to the each point. Each point in each of the plurality of second complete facial feature maps represents position information of an area in the to-be-recognized image corresponding to the point in the each of the plurality of second complete facial feature maps.

In some embodiments, the plurality of second complete facial feature maps include four second complete facial feature maps. Points in the four second complete facial feature maps respectively represent a horizontal coordinate of an upper-left vertex, a vertical coordinate of the upper-left vertex, a horizontal coordinate of a lower-right vertex, and a vertical coordinate of the lower-right vertex of a corresponding area in the to-be-recognized image.

In some embodiments, the partial facial feature information includes a plurality of partial facial feature maps. The plurality of partial facial feature maps include at least one first partial facial feature map, and a plurality of second partial facial feature maps corresponding to each of the at least one first partial facial feature map. Each point in the each of the at least one first partial facial feature map represents a confidence level indicating an existence of a partial face in an area in the to-be-recognized image corresponding to the point in the each of the at least one first partial facial feature map. Each point in each of the plurality of second partial facial feature maps represents position information of an area in the to-be-recognized image corresponding to the point in the each of the plurality of second partial facial feature maps.

In some embodiments, the partial face includes at least one of: an eye, a nose, or a mouth.

In some embodiments, the plurality of second partial facial feature maps corresponding to the each of the at least one first partial facial feature map include four second partial facial feature maps. Points in the four second partial facial feature maps respectively represent a horizontal coordinate of an upper-left vertex, a vertical coordinate of the upper-left vertex, a horizontal coordinate of a lower-right vertex of the area, and a vertical coordinate of the lower-right vertex of a corresponding area in the to-be-recognized image.

In some embodiments, the second convolutional neural network is a fully convolutional network. The number of convolutional kernels in the last convolutional layer of the fully convolutional network is five.

In a third aspect, some embodiments of the present disclosure provide a server. The server includes: one or more processors; and a storage device, configured to store one or more programs. The one or more programs, when executed by the one or more processors, cause the one or more processors to implement the method in any embodiment of the method for facial recognition.

In a fourth aspect, some embodiments of the present disclosure provide a computer readable storage medium storing a computer program. The program, when executed by a processor, implements the method in any embodiment of the method for facial recognition.

In the method and apparatus for facial recognition provided by some embodiments of the present disclosure, the complete facial feature information and the partial facial feature information are obtained by inputting the acquired to-be-recognized image into the pre-trained first convolutional neural network. Then, the complete facial feature information and the partial facial feature information are inputted into the pre-trained second convolutional neural network to obtain the facial recognition result. Accordingly, in a situation where the face is partially covered and only a partial face is displayed (e.g., a situation where sunglasses or a mouth-muffle is worn), the facial recognition may also be performed in combination with the partial facial feature information, thereby improving the accuracy of the recognition result in the situation where the face is partially covered.

BRIEF DESCRIPTION OF THE DRAWINGS

After reading detailed descriptions of non-limiting embodiments given with reference to the following accompanying drawings, other features, objectives and advantages of the present disclosure will be more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
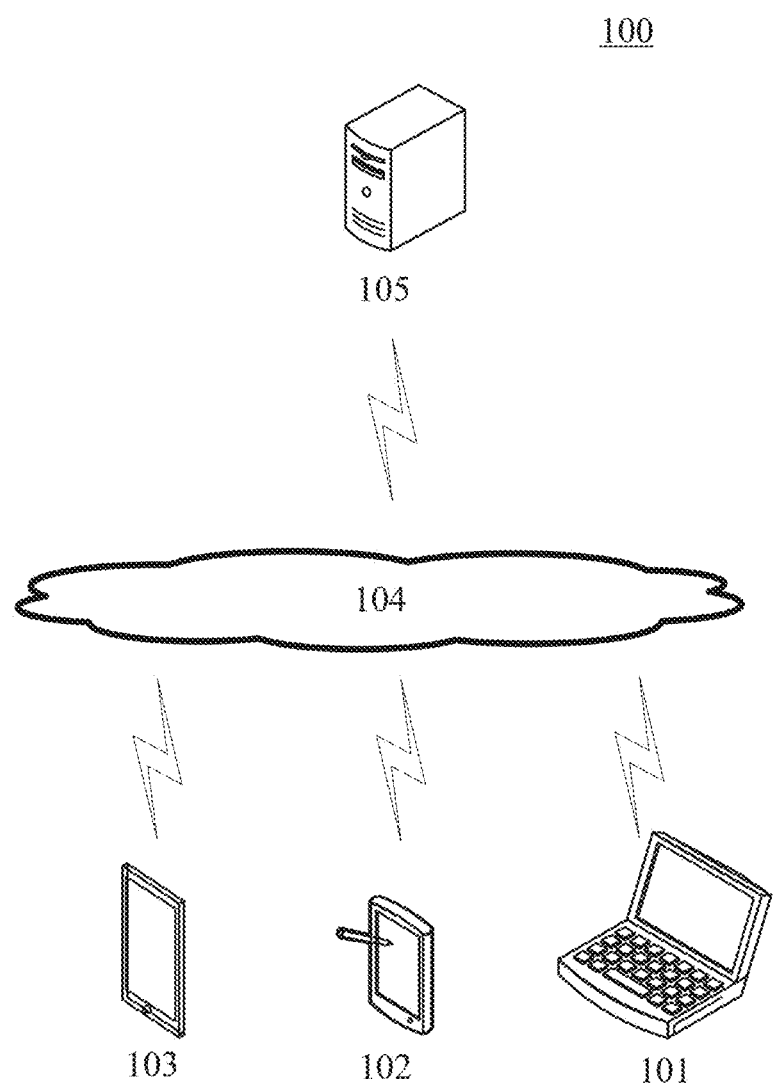
FIG. 1 is a system architecture diagram in which some embodiments of the present disclosure may be applied.

FIG. 1 shows an illustrative architecture of a system 100 which may be used by a method or an apparatus for facial recognition according to some embodiments of the present application.

As shown in FIG. 1, the system architecture 100 may include terminal devices 101, 102 and 103, a network 104 and a server 105. The network 104 serves as a medium providing a communication link between the terminal devices 101, 102 and 103 and the server 105. The network 104 may include various types of connections, such as wired or wireless transmission links, or optical fibers.

The user may use the terminal devices 101, 102 and 103 to interact with the server 105 through the network 104, in order to transmit or receive messages, etc. Various communication client applications, such as camera applications, image-processing applications, or search applications, may be installed on the terminal devices 101, 102 and 103.

The terminal devices 101, 102 and 103 may be various electronic devices having a display and capable of browsing a webpage, including but not limited to, smart phones, tablet computers, laptop computers, or desktop computers.

The server 105 may be a server providing various services, for example, an image-processing server processing an image uploaded from the terminal devices 101, 102 or 103. The image-processing server may analyze the received to-be-recognized image, and return a processing result (for example, a facial recognition result) to the terminal devices.

It should be noted that the method for facial recognition according to some embodiments of the present application is generally executed by the server 105. Accordingly, an apparatus for facial recognition is generally installed on the server 105.

It should be pointed out that the server 105 may also directly store the to-be-recognized image locally, and the server 105 may directly extract the local to-be-recognized image for recognition. In this case, the system architecture 100 may not include the terminal devices 101, 102 and 103, and the network 104.

It should be pointed out that an image processing application may alternatively be provided on the terminal devices 101, 102 and 103. The terminal devices 101, 102 and 103 may also perform a facial recognition on the to-be-recognized image by the image processing application. In this case, the apparatus for facial recognition may alternatively be executed by the terminal devices 101, 102 and 103, and correspondingly, the apparatus for facial recognition may alternatively be provided on the terminal devices 101, 102, 103. In this case, the system architecture 100 may not include the server 105 and the network 104.

It should be understood that the numbers of the terminal devices, the networks and the servers in FIG. 1 are merely illustrative. Any number of terminal devices, networks and servers may be provided based on the actual requirements.

Figure 2:
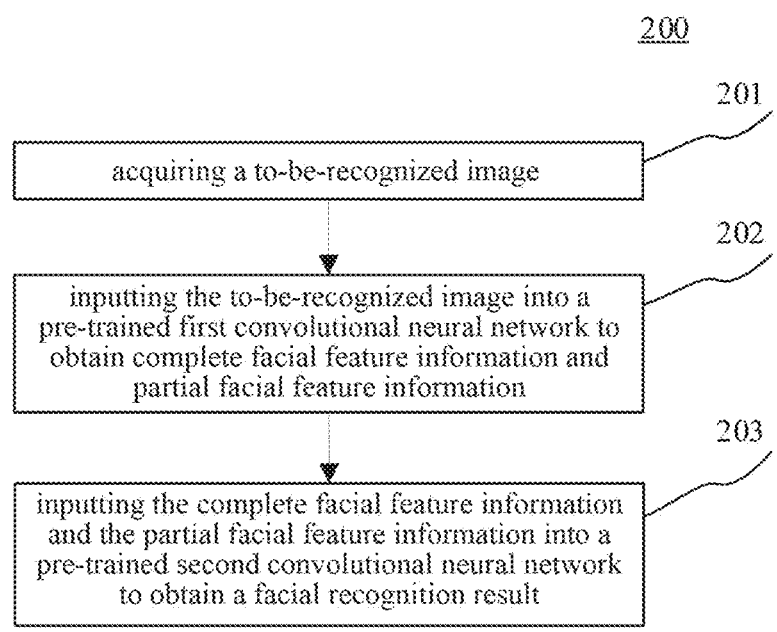
FIG. 2 is a flowchart of an embodiment of a method for facial recognition according to the present disclosure.

Further referring to FIG. 2, a flow 200 of an embodiment of a method for facial recognition according to the present disclosure is shown. The method for facial recognition includes the following steps.

Step 201, acquiring a to-be-recognized image.

In some embodiments, an electronic device (e.g., the server 105 as illustrated in FIG. 1) on which the method for facial recognition is performed may acquire the to-be-recognized image. Here, the to-be-recognized image may be uploaded to the electronic device by a client communicated with the electronic device (e.g., the terminal devices 101, 102 and 103 as illustrated in FIG. 1) by means of a wired or wireless connection. The to-be-recognized image may alternatively be locally stored by the electronic device. It should be pointed out that the wireless connection may include, but not limited to, a 3G/4G connection, a WiFi connection, a bluetooth connection, a WiMAX connection, a Zigbee connection, an UWB (ultra wideband) connection, and other wireless connections currently known or developed in the future.

Step 202, inputting the to-be-recognized image into a pre-trained first convolutional neural network to obtain complete facial feature information and partial facial feature information.

In some embodiments, the electronic device may input the to-be-recognized image into the pre-trained first convolutional neural network to obtain the complete facial feature information and the partial facial feature information. The first convolutional neural network may extract a complete facial feature and a partial facial feature. The first convolutional neural network may include at least one convolutional layer and at least one pooling layer. The convolutional layer may extract an image feature and the pooling layer may perform downsampling on the inputted information. In practice, the convolutional neural network (CNN) is a feed-forward neural network, and an artificial neuron of the convolutional neural network may respond to a part of the surrounding neurons within the coverage range. Thus, the convolutional neural network has excellent performance in image processing. Therefore, the convolutional neural network may extract image feature information. Here, the complete facial feature information may be information representing the complete facial feature in the image. The complete facial feature may be various basic elements related to a complete face (e.g., a probability of being a complete face, and a position of the complete face). The partial facial feature information may be information representing the partial facial feature in the image. The partial facial feature may be various basic elements related to a partial face (e.g., a probability of being a partial face, and a position of the partial face).

It should be noted that the first convolutional neural network may be obtained by performing supervised training on the existing deep convolutional neural network (e.g., DenseBox, VGGNet, ResNet, and SegNet) using a machine learning method and a training sample. The training sample may include a large number of images and an annotation of each image. The annotation may include an annotation indicating whether the area is a facial area and an annotation indicating the position of the facial area (e.g., a coordinate).

In some alternative implementations of this embodiment, the complete facial feature information may be a plurality of complete facial feature maps (e.g., five complete facial feature maps or more than five complete facial feature maps). The plurality of complete facial feature maps may include a first complete facial feature map and a plurality of second complete facial feature maps (e.g., four second complete facial feature maps or more than four second complete facial feature maps). Each point in the first complete facial feature map may represent a confidence level indicating an existence of a complete face in the area in the to-be-recognized image corresponding to the each point (may represent a possibility or probability of existence of the face in the area). Each point in each of the second complete facial feature maps may represent position information of the corresponding area in the to-be-recognized image corresponding to the point in the each of the second complete facial feature maps. It should be noted that the complete facial feature maps may be represented by matrices, and the each point in the complete facial feature maps may be a numerical value in the matrices. In practice, since the first convolutional neural network includes the pooling layer for performing the downsampling operation, the each point in the complete facial feature maps corresponds to one area of the to-be-recognized image.

In some alternative implementations of this embodiment, the plurality of second complete facial feature maps may be four second complete facial feature maps. Points in the four second complete facial feature maps may respectively represent a horizontal coordinate of an upper-left vertex, a vertical coordinate of the upper-left vertex, a horizontal coordinate of a lower-right vertex, and a vertical coordinate of the lower-right vertex of the corresponding area in the to-be-recognized image. It should be noted that the points in the four second complete facial feature maps may also represent other positions of the corresponding area in the to-be-recognized image. As an example, the points may respectively represent a horizontal coordinate of an upper-right vertex, a vertical coordinate of the upper-right vertex, a horizontal coordinate of a lower-left vertex, and a vertical coordinate of the lower-left vertex of the corresponding area in the to-be-recognized image. As another example, the points may respectively represent a horizontal coordinate of a center of the corresponding area in the to-be-recognized image, a vertical coordinate of the center, a height of the area, and a width of the area.

In some alternative implementations of this embodiment, the plurality of second complete facial feature maps may also be more than four (e.g., six or eight) second complete facial feature maps. As an example, when the plurality of second complete facial feature maps are eight second complete facial feature maps, the points in the eight second complete facial feature maps may respectively represent a horizontal coordinate of an upper-left vertex, a vertical coordinate of the upper-left vertex, a horizontal coordinate of a lower-left vertex, a vertical coordinate of the lower-left vertex, a horizontal coordinate of an upper-right vertex, a vertical coordinate of the upper-right vertex, a horizontal coordinate of a lower-right vertex, and a vertical coordinate of the lower-right vertex of the corresponding area in the to-be-recognized image.

In some alternative implementations of this embodiment, the partial facial feature information includes a plurality of partial facial feature maps (e.g., five partial facial feature maps or more than five partial facial feature maps). The plurality of partial facial feature maps may include at least one first partial facial feature map, and a plurality of second partial facial feature maps (e.g., four second partial facial feature maps or more than four second partial facial feature maps) corresponding to each of the at least one first partial facial feature map. Each point in the each of the at least one first partial facial feature map may represent a confidence level indicating the existence of the partial face in the area in the to-be-recognized image corresponding to the point in the each of the at least one first partial facial feature map. Each point in each of the plurality of second partial facial feature maps may represent position information of the area in the to-be-recognized image corresponding to the point in the each of the plurality of second partial facial feature maps. It should be noted that the partial facial feature maps may be represented by matrices, and the each point in the partial facial feature maps may be a numerical value in the matrices. In practice, since the first convolutional neural network includes the pooling layer for performing the downsampling operation, the each point in the partial facial feature maps corresponds to one area in the to-be-recognized image. In practice, the partial face may be one or more parts of the face, such as an ear, an eye, a nose, a mouth, a chin, an eyebrow, or a forehead.

In some alternative implementations of this embodiment, the partial face may include at least one of: the eye, the nose, or the mouth.

In some alternative implementations of this embodiment, the plurality of second partial facial feature maps corresponding to the each of the at least one first partial facial feature map may be four second partial facial feature maps. Points in the four second partial facial feature maps respectively represent a horizontal coordinate of an upper-left vertex, a vertical coordinate of the upper-left vertex, a horizontal coordinate of a lower-right vertex, and a vertical coordinate of the lower-right vertex of the corresponding area in the to-be-recognized image. It should be noted that the points in the four second partial facial feature maps may also represent other positions of the corresponding area in the to-be-recognized image, which will not be repeatedly described here. As an example, the partial face is respectively the eye, the nose, or the mouth. The at least one first partial facial feature map is three first partial facial feature maps respectively corresponding to the eye, the nose, or the mouth. The first partial facial feature maps respectively corresponding to the eye, the nose, or the mouth respectively correspond to four second partial facial feature maps. In such case, five complete facial feature maps and 15 partial facial feature maps are generated.

In some alternative implementations of this embodiment, the plurality of second partial facial feature maps corresponding to the each of the at least one first partial facial feature map may also be more than four (e.g., six or eight) second partial facial feature maps. Taking eight second partial facial feature maps as an example, points in the eight second partial facial feature maps may respectively represent a horizontal coordinate of an upper-left vertex, a vertical coordinate of the upper-left vertex, a horizontal coordinate of a lower-left vertex, a vertical coordinate of the lower-left vertex, a horizontal coordinate of an upper-right vertex, a vertical coordinate of the upper-right vertex, a horizontal coordinate of a lower-right vertex, and a vertical coordinate of the lower-right vertex of the corresponding area in the to-be-recognized image.

Step 203, inputting the complete facial feature information and the partial facial feature information into a pre-trained second convolutional neural network to obtain a facial recognition result.

In some embodiments, the electronic device may input the complete facial feature information and the partial facial feature information into the pre-trained second convolutional neural network to obtain the facial recognition result. The second convolutional neural network may represent a correlation between the facial recognition result, and the complete facial feature information and the partial facial feature information. It should be noted that the second convolutional neural network may include a plurality of (e.g., three) convolutional layers, and may combine and analyze the complete facial feature information and the partial facial feature information to finally obtain the facial recognition result. The facial recognition result may indicate the position of the facial area in the to-be-recognized image (e.g., may be represented by the coordinate of an upper-left corner of the facial area and the coordinate of a lower-right corner of the facial area). In general, the position of the facial area may be marked by a block in the to-be-recognized image. It should be noted that the second convolutional neural network may be obtained by performing the supervised training on the existing convolutional neural network (e.g., DenseBox, VGGNet, ResNet, and SegNet) by using the machine learning method and a training sample. The training sample may include complete facial features and partial facial features of the large number of images, and preset facial recognition results as annotations.

In some alternative implementations of this embodiment, the second convolutional neural network may be a fully convolutional network (FCN). The number of convolutional kernels in the last convolutional layer of the fully convolutional network may be five.

Figure 3:
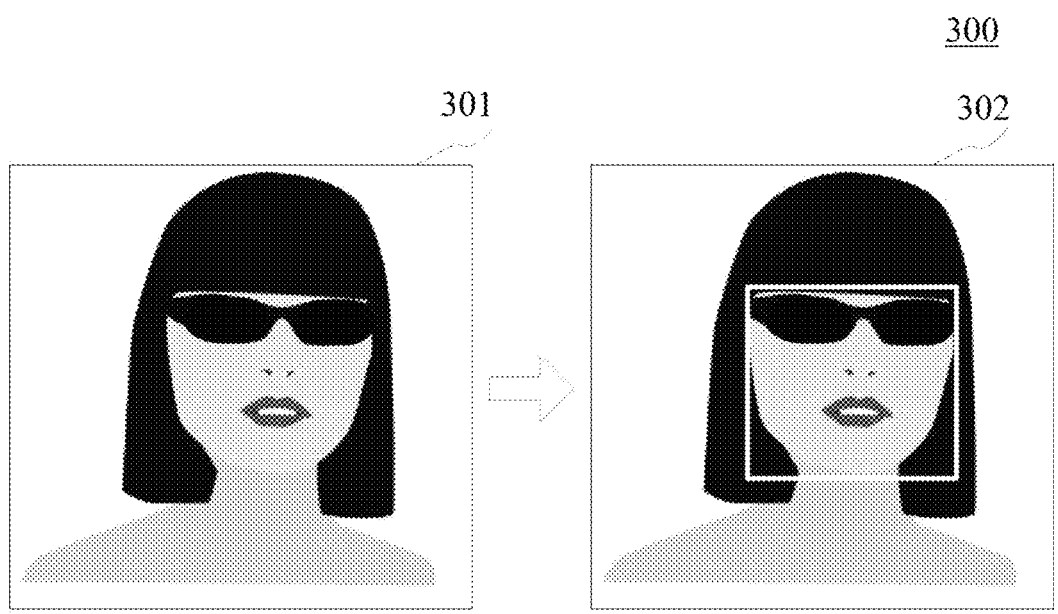
FIG. 3 is a schematic diagram of an application scenario of the method for facial recognition according to some embodiments of the present disclosure.

Further referring to FIG. 3, which is a schematic diagram of an application scenario of the method for facial recognition according to some embodiments. In the application scenario of FIG. 3, the client first uploads the to-be-recognized image 301 to the image processing server. Then, the image processing server inputs the to-be-recognized image 301 into the pre-trained first convolutional neural network to obtain the complete facial feature information and the partial facial feature information. Next, the image processing server inputs the complete facial feature information and the partial facial feature information into the pre-trained second convolutional neural network to obtain the facial recognition result. The area of the complete face in the to-be-recognized image 301 is displayed by the block (as shown in the image labelled by the reference number 302).

In the method provided by some embodiments of the present disclosure, the complete facial feature information and the partial facial feature information are obtained by inputting the acquired to-be-recognized image into the pre-trained first convolutional neural network. Then, the complete facial feature information and the partial facial feature information are inputted into the pre-trained second convolutional neural network to obtain the facial recognition result. Accordingly, in a situation where the face is partially covered and only the partial face is displayed (e.g., a situation where sunglasses or a mouth-muffle is worn), the facial recognition may also be performed in combination with the partial facial feature information, thereby improving the accuracy of the recognition result in the situation where the face is partially covered.

Figure 4:
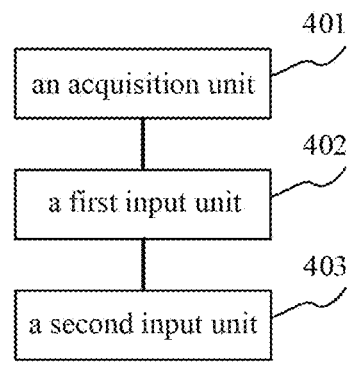
FIG. 4 is a schematic structural diagram of an embodiment of an apparatus for facial recognition according to the present disclosure.

Further referring to FIG. 4, as an implementation of the method shown in the above figures, the present disclosure provides an embodiment of an apparatus for facial recognition. The embodiment of the apparatus corresponds to the embodiment of the method as illustrated in FIG. 2, and this apparatus may be applied in various electronic devices.

As shown in FIG. 4, the apparatus for facial recognition 400 in some embodiments includes: an acquisition unit 401, configured to acquire a to-be-recognized image; a first input unit 402, configured to input the to-be-recognized image into a pre-trained first convolutional neural network to obtain complete facial feature information and partial facial feature information, the first convolutional neural network being used to extract a complete facial feature and a partial facial feature; and a second input unit 403, configured to input the complete facial feature information and the partial facial feature information into a pre-trained second convolutional neural network to obtain a facial recognition result, the second convolutional neural network being used to represent a correlation between the facial recognition result, and the complete facial feature information and the partial facial feature information.

In some embodiments, the acquisition unit 401 may acquire the to-be-recognized image.

In some embodiments, the first input unit 402 may input the to-be-recognized image into the pre-trained first convolutional neural network to obtain the complete facial feature information and the partial facial feature information. The first convolutional neural network may extract the complete facial feature and the partial facial feature.

In some embodiments, the second input unit 403 may input the complete facial feature information and the partial facial feature information into the pre-trained second convolutional neural network to obtain the facial recognition result. The second convolutional neural network may represent the correlation between the facial recognition result, and the complete facial feature information and the partial facial feature information.

In some alternative implementations of this embodiment, the complete facial feature information may be a plurality of complete facial feature maps. The plurality of complete facial feature maps may include a first complete facial feature map and a plurality of second complete facial feature maps. Each point in the first complete facial feature map may represent a confidence level indicating an existence of a complete face in the area in the to-be-recognized image corresponding to the each point. Each point in each of the second complete facial feature maps may represent position information of the area in the to-be-recognized image corresponding to the point in the each of the second complete facial feature maps.

In some alternative implementations of this embodiment, the plurality of second complete facial feature maps may be four second complete facial feature maps. Points in the four second complete facial feature maps may respectively represent a horizontal coordinate of an upper-left vertex, a vertical coordinate of the upper-left vertex, a horizontal coordinate of a lower-right vertex, and a vertical coordinate of the lower-right vertex of the corresponding area in the to-be-recognized image.

In some alternative implementations of this embodiment, the partial facial feature information may be a plurality of partial facial feature maps. The plurality of partial facial feature maps may include at least one first partial facial feature map, and a plurality of second partial facial feature maps corresponding to each of the at least one first partial facial feature map. Each point in the each of the at least one first partial facial feature map may represent a confidence level indicating an existence of a partial face in the area in the to-be-recognized image corresponding to the point in the each of the at least one first partial facial feature map. Each point in each of the plurality of second partial facial feature maps may represent position information of the area in the to-be-recognized image corresponding to the point in the each of the plurality of second partial facial feature maps.

In some alternative implementations of this embodiment, the partial face may include at least one of: an eye, a nose, or a mouth.

In some alternative implementations of this embodiment, the plurality of second partial facial feature maps corresponding to the each of the at least one first partial facial feature map may be four second partial facial feature maps. Points in the four second partial facial feature maps may respectively represent a horizontal coordinate of an upper-left vertex, a vertical coordinate of the upper-left vertex, a horizontal coordinate of a lower-right vertex, and a vertical coordinate of the lower-right vertex of the corresponding area in the to-be-recognized image.

In some embodiments, the second convolutional neural network may be a fully convolutional network. The number of convolutional kernels in the last convolutional layer of the fully convolutional network is five.

In the apparatus provided in some embodiments according to the present disclosure, the first input unit 402 inputs the to-be-recognized image acquired by the acquisition unit 401 into the pre-trained first convolutional neural network to obtain the complete facial feature information and the partial facial feature information. Then, the second input unit 403 inputs the complete facial feature information and the partial facial feature information into the pre-trained second convolutional neural network to obtain the facial recognition result. Accordingly, in a situation where the face is partially covered and only the partial face is displayed (e.g., a situation where sunglasses or a mouth-muffle is worn), the facial recognition may also be performed in combination with the partial facial feature information, thereby improving the accuracy of the recognition result in the situation where the face is partially covered.

Figure 5:
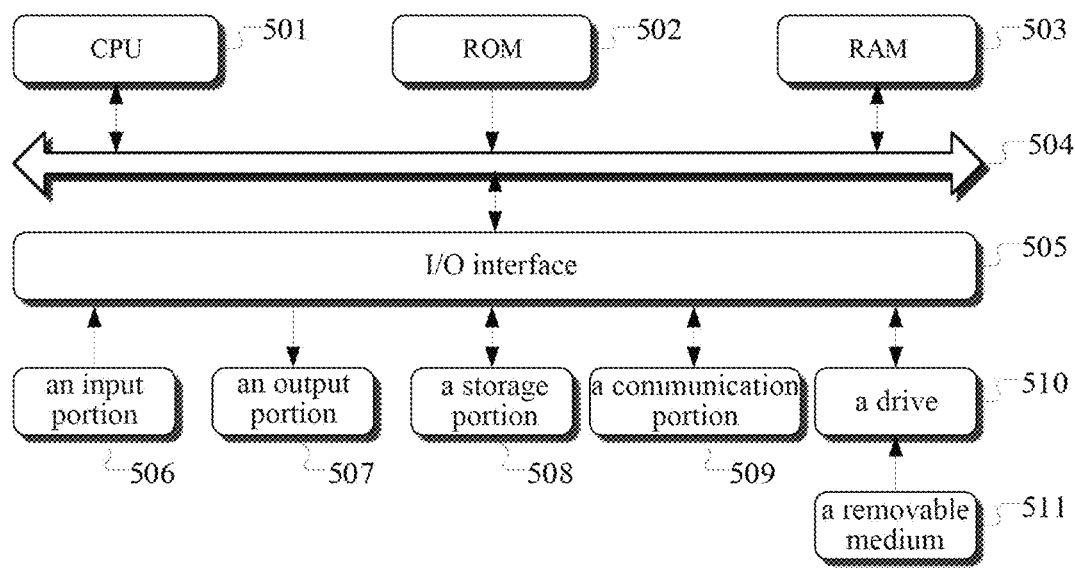
FIG. 5 is a schematic structural diagram of a computer system adapted to implement a server according to some embodiments of the present disclosure.

Referring to FIG. 5, a schematic structural diagram of a computer system 500 adapted to implement a server of some embodiments of the present application is shown. The server shown in FIG. 5 is merely an example and should not impose any restriction on the function and scope of use of the embodiments of the present application.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like;

and a communication portion 509 comprising a network interface card, such as a LAN card and a modem. The communication portion 509 performs communication processes via a network, such as the Internet. A drive 510 is also connected to the I/O interface 505 as required. A removable medium 511, such as a magnetic disk, an optical disk, a magneto-optical disk, and a semiconductor memory, may be installed on the drive 510, to facilitate the retrieval of a computer program from the removable medium 511, and the installation thereof on the storage portion 508 as needed.

In particular, according to some embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 509, and/or may be installed from the removable media 511. The computer program, when executed by the central processing unit (CPU) 501, implements the above mentioned functionalities as defined by the methods of the present disclosure. It should be noted that the computer readable medium in the present disclosure may be computer readable storage medium. An example of the computer readable storage medium may include, but not limited to: semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. The computer readable medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved.

It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising an acquisition unit, a first input unit, and a second input unit, where the names of these units or modules do not in some cases constitute a limitation to such units or modules themselves. For example, the acquisition unit may also be described as "a unit for acquiring a to-be-recognized image."

In another aspect, some embodiments of the present application further provide a non-transitory computer-readable storage medium. The non-transitory computer-readable storage medium may be the non-transitory computer-readable storage medium included in the apparatus in the above described embodiments, or a stand-alone non-transitory computer-readable storage medium not assembled into the apparatus. The non-transitory computer-readable storage medium stores one or more programs. The one or more programs, when executed by a device, cause the device to: acquire a to-be-recognized image; input the to-be-recognized image into a pre-trained first convolutional neural network to obtain complete facial feature information and partial facial feature information, the first convolutional neural network being used to extract a complete facial feature and a partial facial feature; and input the complete facial feature information and the partial facial feature information into a pre-trained second convolutional neural network to obtain a facial recognition result, the second convolutional neural network being used to represent a correlation between the facial recognition result, and the complete facial feature information and the partial facial feature information.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:

1. A method for recognizing a face, comprising:
acquiring a to-be-recognized image;
inputting the to-be-recognized image into a pre-trained first convolutional neural network to obtain complete facial feature information and partial facial feature information, the first convolutional neural network being used to extract a complete facial feature and a partial facial feature; and
inputting the complete facial feature information and the partial facial feature information into a pre-trained second convolutional neural network to obtain a facial recognition result, the second convolutional neural network being used to represent a correlation between the facial recognition result, and the complete facial feature information and the partial facial feature information, wherein the method is performed by at least one processor.

2. The method according to claim 1, wherein the complete facial feature information comprises a plurality of complete facial feature maps, and the plurality of complete facial feature maps comprise a first complete facial feature map and a plurality of second complete facial feature maps, each point in the first complete facial feature map represents a confidence level indicating an existence of a complete face in an area in the to-be-recognized image corresponding to the each point, and each point in each of the plurality of second complete facial feature maps represents position information of an area in the to-be-recognized image corresponding to the point in the each of the plurality of second complete facial feature maps.

3. The method according to claim 2, wherein the plurality of second complete facial feature maps comprise four second complete facial feature maps, and points in the four second complete facial feature maps respectively represent a horizontal coordinate of an upper-left vertex, a vertical coordinate of the upper-left vertex, a horizontal coordinate of a lower-right vertex, and a vertical coordinate of the lower-right vertex of a corresponding area in the to-be-recognized image.

4. The method according to claim 1, wherein the partial facial feature information comprises a plurality of partial facial feature maps, and the plurality of partial facial feature maps comprise at least one first partial facial feature map, and a plurality of second partial facial feature maps corresponding to each of the at least one first partial facial feature map, wherein each point in the each of the at least one first partial facial feature map represents a confidence level indicating an existence of a partial face in an area in the to-be-recognized image corresponding to the point in the each of the first partial facial feature map, and each point in each of the plurality of second partial facial feature maps represents position information of an area in the to-be-recognized image corresponding to the point in the each of the plurality of second partial facial feature maps.

5. The method according to claim 4, wherein the partial face comprises at least one of: an eye, a nose, or a mouth.

6. The method according to claim 4, wherein the plurality of second partial facial feature maps corresponding to the each of the at least one first partial facial feature map comprise four second partial facial feature maps, and points in the four second partial facial feature maps respectively represent a horizontal coordinate of an upper-left vertex, a vertical coordinate of the upper-left vertex, a horizontal coordinate of a lower-right vertex of the area, and a vertical coordinate of the lower-right vertex of a corresponding area in the to-be-recognized image.

7. The method according to claim 1, wherein the second convolutional neural network is a fully convolutional network, and a number of convolutional kernels in a last convolutional layer of the fully convolutional network is five.

8. An apparatus for facial recognition, comprising:
at least one processor; and
a memory storing instructions, the instructions when executed by the at least one processor, cause the at least one processor to perform operations, the operations comprising:
acquiring a to-be-recognized image;

inputting the to-be-recognized image into a pre-trained first convolutional neural network to obtain complete facial feature information and partial facial feature information, the first convolutional neural network being used to extract a complete facial feature and a partial facial feature; and inputting the complete facial feature information and the partial facial feature information into a pre-trained second convolutional neural network to obtain a facial recognition result, the second convolutional neural network being used to represent a correlation between the facial recognition result, and the complete facial feature information and the partial facial feature information.

9. The apparatus according to claim 8, wherein the complete facial feature information comprises a plurality of complete facial feature maps, and the plurality of complete facial feature maps comprise a first complete facial feature map and a plurality of second complete facial feature maps, each point in the first complete facial feature map represents a confidence level indicating an existence of a complete face in an area in the to-be-recognized image corresponding to the each point, and each point in each of the plurality of second complete facial feature maps represents position information of an area in the to-be-recognized image corresponding to the point in the each of the plurality of second complete facial feature maps.

10. The apparatus according to claim 9, wherein the plurality of second complete facial feature maps comprise four second complete facial feature maps, and points in the four second complete facial feature maps respectively represent a horizontal coordinate of an upper-left vertex, a vertical coordinate of the upper-left vertex, a horizontal coordinate of a lower-right vertex, and a vertical coordinate of the lower-right vertex of a corresponding area in the to-be-recognized image.

11. The apparatus according to claim 8, the partial facial feature information comprises a plurality of partial facial feature maps, and the plurality of partial facial feature maps comprise at least one first partial facial feature map, and a plurality of second partial facial feature maps corresponding to each of the at least one first partial facial feature map, wherein each point in the each of the at least one first partial facial feature map represents a confidence level indicating an existence of a partial face in an area in the to-be-recognized image corresponding to the point in the each of the first partial facial feature map, and each point in each of the plurality of second partial facial feature maps represents position information of an area in the to-be-recognized image corresponding to the point in the each of the plurality of second partial facial feature maps.

12. The apparatus according to claim 11, wherein the partial face comprises at least one of: an eye, a nose, or a mouth.

13. The apparatus according to claim 11, wherein the plurality of second partial facial feature maps corresponding to the each of the at least one first partial facial feature map comprise four second partial facial feature maps, and points in the four second partial facial feature maps respectively represent a horizontal coordinate of an upper-left vertex, a vertical coordinate of the upper-left vertex, a horizontal coordinate of a lower-right vertex of the area, and a vertical coordinate of the lower-right vertex of a corresponding area in the to-be-recognized image.

14. The apparatus according to claim 8, wherein the second convolutional neural network is a fully convolutional network, and a number of convolutional kernels in a last convolutional layer of the fully convolutional network is five.

15. A non-transitory computer-readable storage medium storing a computer program, the computer program when executed by one or more processors, causes the one or more processors to perform operations, the operations comprising:
   acquiring a to-be-recognized image;
   inputting the to-be-recognized image into a pre-trained first convolutional neural network to obtain complete facial feature information and partial facial feature information, the first convolutional neural network being used to extract a complete facial feature and a partial facial feature; and
   inputting the complete facial feature information and the partial facial feature information into a pre-trained second convolutional neural network to obtain a facial recognition result, the second convolutional neural network being used to represent a correlation between the facial recognition result, and the complete facial feature information and the partial facial feature information.

* * * * *